United States Patent
Varadaraj et al.

(10) Patent No.: US 7,008,536 B2
(45) Date of Patent: Mar. 7, 2006

(54) OIL DESALTING AND DEWATERING

(75) Inventors: Ramesh Varadaraj, Flemington, NJ (US); Rutton D. Patel, Berkeley Heights, NJ (US); Ramesh R. Hemrajani, Millington, NJ (US); Salvatore J. Rossetti, Bernardsville, NJ (US); David W. Savage, Lebanon, NJ (US)

(73) Assignee: ExxonMobil Research and Engineering Co., Annandale, NJ (US)

(*) Notice: Subject to any disclaimer, the term of this patent is extended or adjusted under 35 U.S.C. 154(b) by 74 days.

(21) Appl. No.: 10/423,734

(22) Filed: Apr. 25, 2003

(65) Prior Publication Data
US 2003/0217971 A1 Nov. 27, 2003

Related U.S. Application Data

(60) Provisional application No. 60/382,248, filed on May 21, 2002.

(51) Int. Cl.
*C02F 1/46* (2006.01)
(52) U.S. Cl. .................. 210/243; 204/275.1; 204/563; 210/519; 210/DIG. 5; 208/187
(58) Field of Classification Search ............... 210/243, 210/519, 634, 639, 708, 748, 800, DIG. 5; 204/164, 263, 563, 567, 569, 275.1; 208/187, 208/188; 516/181, 183, 191, 193
See application file for complete search history.

(56) References Cited

U.S. PATENT DOCUMENTS

| | | | | |
|---|---|---|---|---|
| 2,894,895 | A | * | 7/1959 | Turner ........................ 204/666 |
| 3,141,000 | A | * | 7/1964 | Turner .................... 137/599.01 |
| 4,374,724 | A | * | 2/1983 | Robinson ..................... 204/662 |
| 4,511,452 | A | | 4/1985 | Robinson ..................... 204/302 |
| 6,168,702 | B1 | | 1/2001 | Varadaraj et al. ........... 204/567 |
| 6,228,239 | B1 | | 5/2001 | Manalastas et al. ........ 204/567 |

FOREIGN PATENT DOCUMENTS

| | | |
|---|---|---|
| EP | 0019640 A1 | 10/1980 |
| GB | 875119 | 8/1961 |

* cited by examiner

*Primary Examiner*—Joseph Drodge
(74) *Attorney, Agent, or Firm*—Robert A. Migliorini; Ramesh Varadaraj

(57) ABSTRACT

The invention includes a method for dewatering and/or desalting a water-in-oil emulsion comprising introducing a plurality of streams of the emulsion into the electrostatic field under opposed flow whereby the water coalescence is enhanced. The invention also includes an improved electrostatic apparatus for dewatering and/or desalting a water-in-oil emulsion comprising a plurality of horizontally directed nozzles positioned to introduce a plurality of streams of the emulsion into the electrostatic field under opposed flow conditions.

6 Claims, 6 Drawing Sheets

US 7,008,536 B2

OIL DESALTING AND DEWATERING

This is a Non-Provisional application of Provisional U.S. Ser. No. 60/382,248 filed May 21, 2002.

FIELD OF THE INVENTION

The invention relates to a method and apparatus for desalting and/or dewatering hydrocarbon oils in an electrostatic field.

BACKGROUND

Hydrocarbon oils, particularly crude oils when produced comprise varying amounts of water and inorganic salts like halogens, sulfates and carbonates of Group I and Group II elements of The Periodic Table of Elements. (The Periodic Table of Elements referred to herein is the long form of the periodic table; Advanced Inorganic Chemistry by F. A. Cotton and G. Wilkinson Interscience Publishers, 1962.) Removal of water from produced crude oils is termed dewatering and salt removal is termed desalting. Often, the process of dewatering also desalts the crude oil since water-soluble salts are removed with the water.

Dewatering the produced crude oil is essential at crude oil production facilities as it impacts the value of crude oil and its economic transportation. The presence of salts, especially chlorides of Group I and Group II elements of The Periodic Table of Elements, corrode oil processing equipment. In order to mitigate the effects of corrosion, it is advantageous to reduce the salt concentration to the range of 1 to 5 ppm or less and water content to about 0.25 to 1 wt % by weight of the crude oil prior to transportation and processing of the oil.

Among the crude oil dewatering and/or desalting methods in use today, electrostatic separation methods are frequently used with crude oils containing about 0.5 to 12% water. In refinery desalting processes wash water is added to crude oil resulting in an emulsion having a water content is in the range of 4 to 8 vol %. Frequently a chemical emulsion breaker is also added to the emulsion. Then the emulsion is subjected to an electrostatic field so that, water droplets in the mixture of crude oil, wash water, and chemical emulsion breaker coalesce in the electrostatic field between electrodes. The coalesced water droplets settle below the oleaginous crude oil phase and are removed. Treated crude oil typically containing about 1 to 5 ppm inorganic salts is removed from the upper part of the separator.

One problem encountered with the electrostatic dewatering and desalting is that some crude oils form an undesirable "rag" layer comprising a stable oil-water emulsion and solids at the water-oil phase boundary in the desalter vessel. The rag layer often remains in the vessel but it may be removed therefrom for storage or further processing. Rag layers at the water-oil phase boundary result in oil loss and reduced processing capacity. Heavy crude oils containing high concentrations of asphaltenes, resins, waxes, and napthenic acids exhibit a high propensity to form rag layers.

Another problem associated with electrostatic desalting is that the brine droplets in crude oils are stabilized by oil components such as, asphaltenes, resins and naphthenic acids and the efficiency of desalting and dewatering is reduced. To overcome this problem U.S. Pat. No. 6,228,239 discloses use of certain chemical demulsifier formulations and optionally subjecting the crude oil and brine mixture or emulsion to opposed flow mixing prior to subjecting the mixture or emulsion to electrostatic desalting and or dewatering conditions. There is a continuing need for improved crude oil dewatering and/or desalting methods that improve the efficiency of dewatering and/or desalting especially with heavy crude oils containing asphaltenes and naphthenic acids. The present invention addresses this need.

SUMMARY OF THE INVENTION

The invention includes an improvement in the electrostatic method and apparatus for treating emulsions comprising water and oil for dewatering, desalting or both.

There is a method for treating a water-in-oil emulsion for purposes of dewatering, desalting or both by introducing the emulsion into an electrostatic field wherein the water of the emulsion is coalesced and separated from the oil, the improvement comprising introducing a plurality of streams of the emulsion into the electrostatic field under opposed flow whereby the water coalescence is enhanced.

Also is an electrostatic apparatus for subjecting a water-in-oil emulsion to an electrostatic field to coalesce the water for removal from the oil and wherein a plurality of conduits and distributors are provided for introducing the emulsion into the electrostatic field, the improvement in the apparatus comprising a plurality of horizontally directed nozzles in communication with the conduits and distributors and positioned to introduce a plurality of streams of the emulsion into the electrostatic field under opposed flow conditions.

BRIEF DESCRIPTION OF THE DRAWINGS

The invention and its advantages will be better understood by referring to the drawings which are not necessarily to scale and in which like numerals identify like parts and in which.

Figure 1:
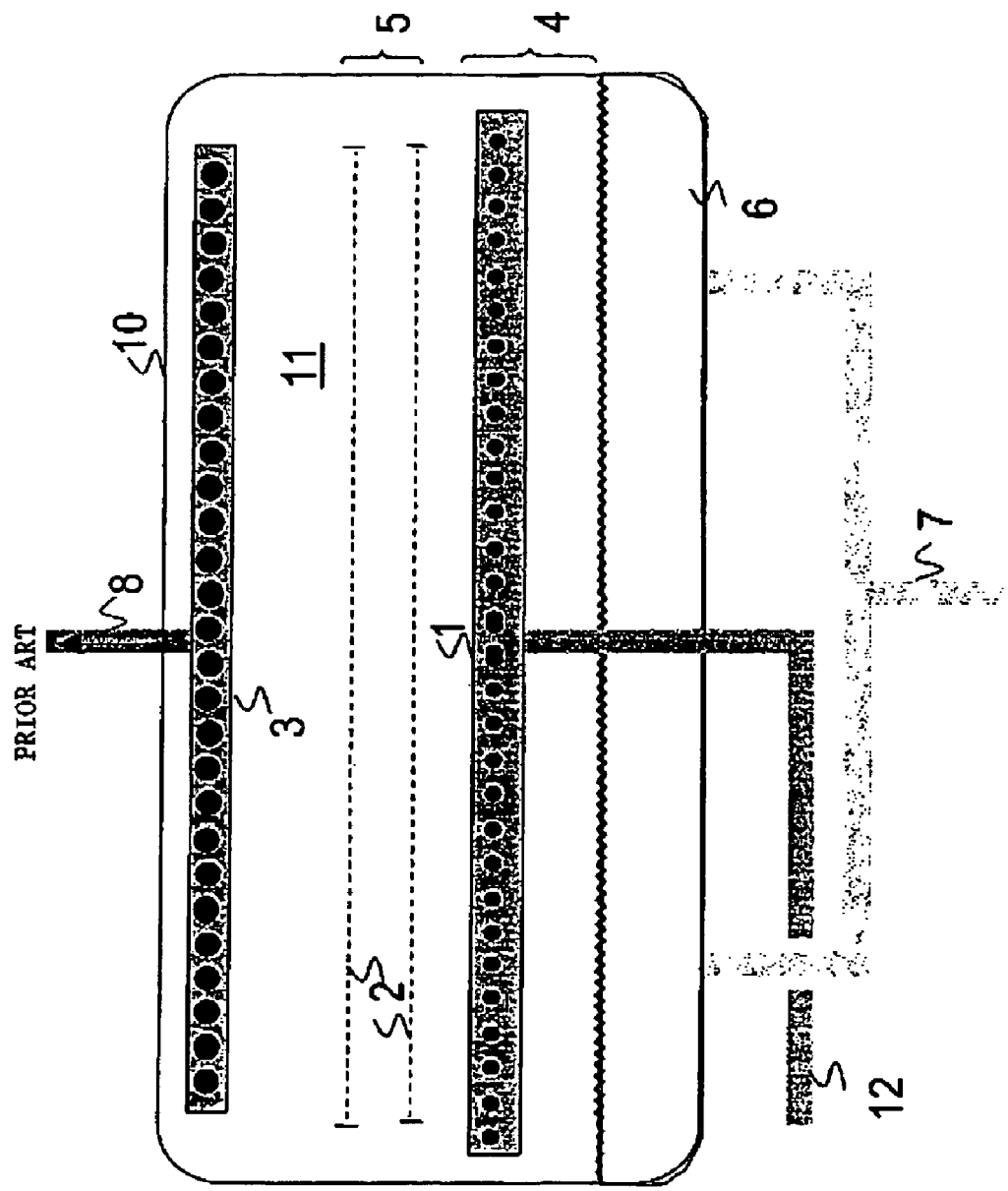
FIG. 1 is a schematic of a prior art desalter equipped with a low velocity distributor and two energized electrodes, referred to as a "low velocity" desalter design.

The drawings illustrate specific embodiments of the method and apparatus of this invention. The drawings are not intended to exclude from the scope of the invention other embodiments that are the result of normal and expected modifications of these specific embodiments.

DETAILED DESCRIPTION OF THE INVENTION

The improved desalting and/or dewatering process of the present invention is useful for hydrocarbon oils comprising salts, water and mixtures thereof. It is particularly useful for heavy and waxy crude oils that are generally difficult to dewater and/or desalt. The salts present in the hydrocarbon oil are inorganic salts including halogens, sulfates and carbonates of Group I and Group II elements of The Periodic Table of Elements. The concentration of the salts can vary from about 0.001 to 10 wt % based on the weight of the hydrocarbon oil. The process is effective for both water-soluble and water insoluble salts that are suspended in the hydrocarbon oil. The water content of the hydrocarbon oil-water mixture can vary in the range of 0.5 wt % to 20 wt % based on the weight of the hydrocarbon-water mixture. If the water content of the hydrocarbon-water mixture is below 1 wt % water is added to the crude oil. This added water is generally termed wash water. Wash water addition is a common practice in refinery desalting environments. It is preferred that wash water is fresh water that is free of salts. The physical state of the mixture of hydrocarbon oil, water and salts is usually a water-in-hydrocarbon oil emulsion. In this physical state, water droplets containing soluble salts are dispersed as droplets in a hydrocarbon oil continuous phase. The hydrocarbon oil phase may also contain insoluble salts dispersed in it. The hydrocarbon oil can be a crude oil, crude oil distillate, and crude oil residuum from distillation or mixtures thereof.

In a preferred embodiment, the hydrocarbon oil (hereinafter called oil) and water are combined to form a water-in-oil emulsion. The water-in-oil emulsion is then subject to opposed flow mixing in an electrostatic field. The process results in demulsification or separation of the emulsion into a water phase and an oil phase. Water-soluble salts are contained in the water phase and insoluble salts are either "water wetted" to drop into the aqueous phase, remain "oil wetted" to stay in the oil phase or separate into an intermediate rag layer between the water and oil phases. The desalted oil and salt containing water are drawn off from the top and bottom of separator vessel respectively. The insoluble salts are contained in a rag layer in-between the oil and separated water and are drawn off the bottom of the separator vessel for further processing or disposal.

The opposed flow mixing is conducted in an electrostatic field wherein the electrodes are at potentials ranging from about 10,000 volts to about 40,000 volts, A.C. or D.C. Voltage gradients in the electrostatic field range from about 500 volts per inch to about 5,000 volts per inch, preferably ranging from about 500 to about 1,000 volts per inch. Residence times in the electrostatic fields range from about 0.5 to about 120 minutes, preferably from about 0.5 to about 15 minutes.

The opposed flow mixing energy is controlled in a range where water droplet coalescence occurs. The opposed flow mixing energy will depend, for example, on the emulsion viscosity. Opposed flow mixing energy expressed as opposed flow power is the power with which the emulsion is pumped into the separator vessel and through the nozzles. The opposed flow power can be expressed in horsepower (hp) per 1000 gallons of fluid or in kilowatt (kW) per 1000 cubic meter. The opposed flow power will typically range from about 0.1 hp (0.07457 kW) per 1000 gallons (3.79 cubic meters) to about 3 hp (2.237 kW) per 1000 gallons (3.79 cubic meters) of the water-in-crude oil emulsion. The preferred range is about 0.2 hp (0.14914 kW) per 1000 gallons (3.79 cubic meters) to about 0.5 hp (0.3728 kW) per 1000 gallons (3.79 cubic meters) of the water-in-crude oil emulsion. The opposed flow mixing is conducted in the temperature range from about 20° C. to about 150° C. and emulsion viscosity range from about 1 to about 250 cP at the given temperature. The preferred range is a temperature from about 80° C. to about 130° C. and viscosity from about 1 to about 75 cP at the given temperature. It is preferred to prevent water vaporization during mixing. Water vaporization can be substantially reduced or prevented by increasing the operating pressure in which the opposed flow mixing is conducted. A pressure in the range of 14 psia (96.46 kPa) to 150 psia (1033.5 kPa) is preferred.

Opposed jet configuration is the preferred means for opposed flow mixing in an electrostatic field. In the opposed jet configuration, the water-in-crude oil emulsion is separated into at least two streams. Conducting means such as pipes are used to direct the streams into an opposed flow configuration. Accordingly, the longitudinal axes (the axes in the direction of flow) and the outlets of the pipes are oriented so that the streams impact and intermix in a region between the outlets. Preferably, two opposed pipes are employed and the angle subtended by the longitudinal axes of the pipes is 180°. The angle subtended by the longitudinal axes can range between 195° to 165°. The outlets may be in the form of nozzles or orifices. Parameters such as the surface area of the conduits, the flow rate of the mixture in the conduits, the size and shape of any nozzle or orifice employed, and the distance between the outlets may be determined from mixture properties such as mixture viscosity and the desired mixing energy. One of ordinary skill in the art can determine these parameters.

The improved process further comprises the step of adding chemical emulsion-breakers to the water-in-oil emulsion prior to subjecting it opposed flow mixing in an electrostatic field. A preferred chemical emulsion breaker has the formula:

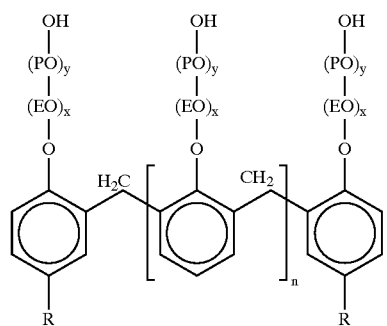

wherein E is (CH$_2$—CH$_2$),

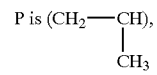

x ranges from 1 to 5, y ranges from 0 to 2, and R is an alkyl group having 4 to 9 carbon atoms, and n ranges from 3 to 9. Preferably, the chemical emulsion-breaker is used in combination with a delivery solvent. Delivery solvents useful in the practice of this invention include a high aromaticity solvent such as toluene, xylene, and high aromatic condensates such as heavy aromatic naphtha in combination with an oxygenated solvent such as diethylene monobutyl ether or benzyl alcohol. A preferred formulation comprises about 10 wt % to about 60 wt % chemical emulsion breaker, about 35 wt % to about 75 wt % diethylene glycol mono butyl ether, and about 5 wt % to about 15 wt % heavy aromatic naphtha. Particularly preferred is a formulation of 45 wt % chemical emulsion-breaker, 50 wt % diethylene glycol mono butyl ether, and 5 wt % heavy aromatic naphtha. An effective amount of the chemical emulsion-breaker-delivery solvent formulation ("chemical demulsifier formulation") is added to with the water-in-oil emulsion in the range from about 1 ppm to about 1,000 ppm based on the weight of the hydrocarbon oil, with about 5 to about 20 ppm being preferred.

The invention also includes an apparatus for dewatering and/or desalting oil wherein a water-in-oil emulsion is subject to opposed flow mixing in an electrostatic field.

Figure 2:
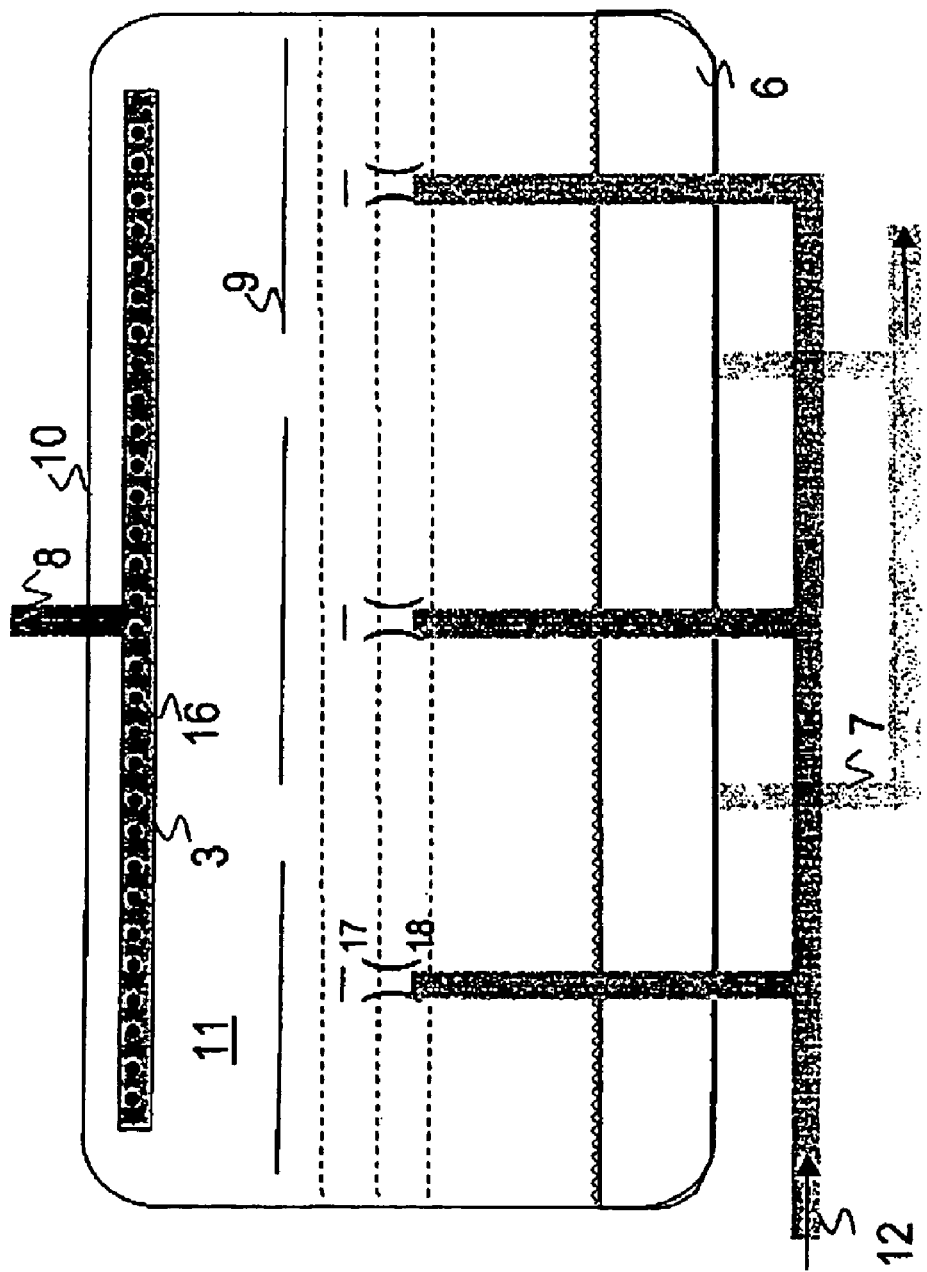
FIG. 2 is a schematic of a prior art Bielectric™ design desalter with three energized electrodes.

In conventional electrostatic desalters, coalescence of water droplets is accomplished predominantly by the action of an electrostatic field. Two prior art examples are shown in FIGS. 1 and 2.

In a "low velocity" desalter (FIG. 1) the crude-water emulsion from the desalter mixing valve (not shown) continuously enters the desalter 10 through a line 12 via a manifold, 1, having a plurality of apertures 14 which serves to distribute it at low velocity more or less evenly over the cross-section of the desalter 10. An electrostatic field generated by the two electrodes, 2, induces dipole attractive forces between neighboring droplets which causes them to migrate towards each other and coalesce. The electrostatic field causes each droplet to have a positive charge on one side and a negative charge on the other. The droplets coalesce because of the attractive force generated by the opposite charges on neighboring droplets. The attractive force is strongly affected by the distance between the droplets, and is much stronger when the droplets are in close proximity. The different fields generated between the lower electrode and the water phase (ground) on the one hand, and between the upper and lower electrodes on the other, result in two coalescence regions (4, 5) but the coalescence mechanism is the same in both. The larger coalesced drops settle by gravity into the water phase 6 at the bottom of the desalter and the brine or wastewater can be removed continuously from the bottom via line 7. The desalted oil 11 flows out continuously through apertures 16 to the outlet line 8 via collector manifold, 3.

The Bilectric design (FIG. 2) can use three energized electrodes, 2, rather than the two in the low velocity design. The crude-water emulsion is continuously pumped via line 12 through radial distributors 17, 18, in the two regions between the electrodes, 2. The emulsion flows out of each distributor as a plane radial jet, and as in the low velocity design, coalescence occurs because of the induced dipoles in the water drops. Baffles, 9, reduce turbulence of the oil layer above the electrodes. Desalted oil 11 flows out through line 8 via the collector manifold 3. The Bilectric design has a higher crude handling capacity for a given vessel volume because of more efficient utilization of the electric field.

Figure 3:
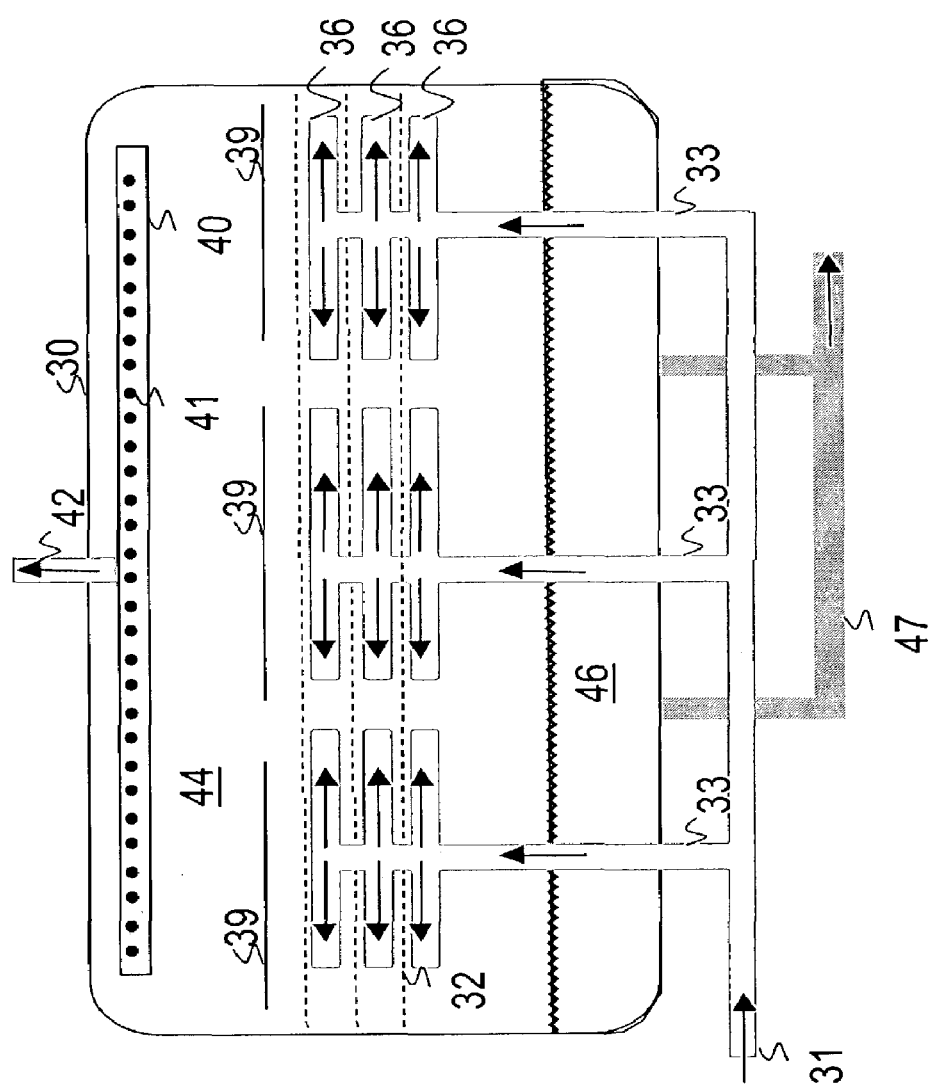
FIG. 3 is a schematic of the longitudinal section of the opposed flow design desalter of the current invention.

The improved apparatus of the current invention (FIGS. 3 and 4) uses hydrodynamic coalescence of water droplets in addition to electrostatically induced coalescence to further increase dewatering and/or desalting efficiency and capacity. FIG. 3 is a longitudinal section and FIG. 4 a transverse section of the internals of the apparatus. The electrostatic dewatering and/or desalter apparatus 30 of the current invention is preferably a closed cylindrical container placed preferably such that the long axis of the cylindrical container is parallel to the ground. The apparatus has at least two energized electrodes. For illustrative purposes, in FIGS. 3 and 4 a configuration with 3 energized electrodes 32 is shown. The energized electrodes 32 are preferably in the form of grids called electrostatic grids.

Figure 4:
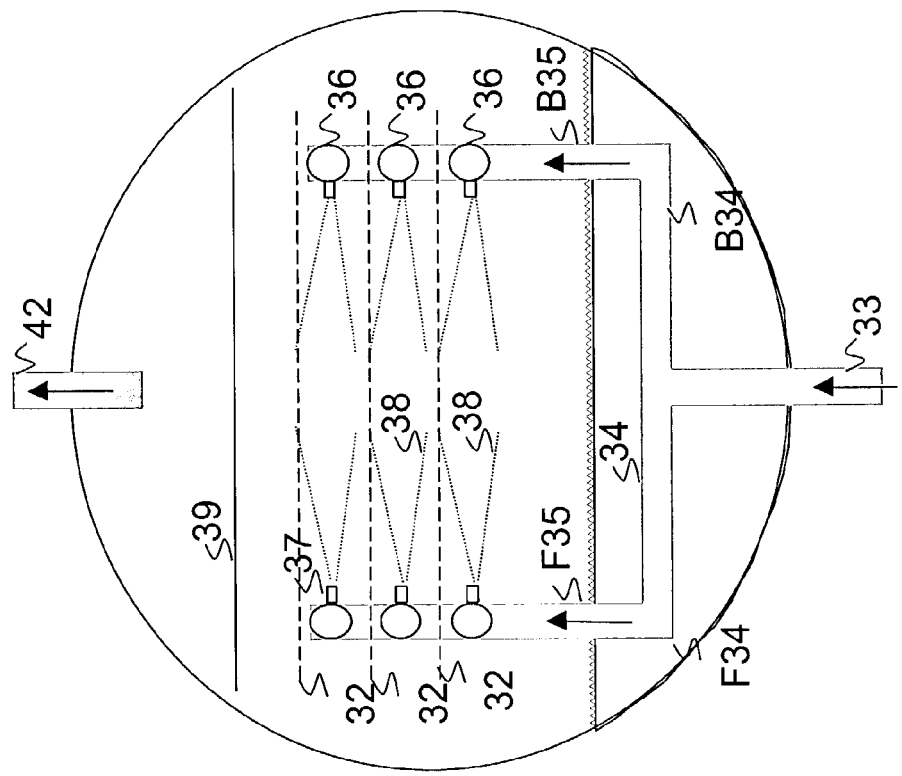
FIG. 4 is a schematic of the transverse section of the opposed flow design desalter of the current invention.
Figure 5:
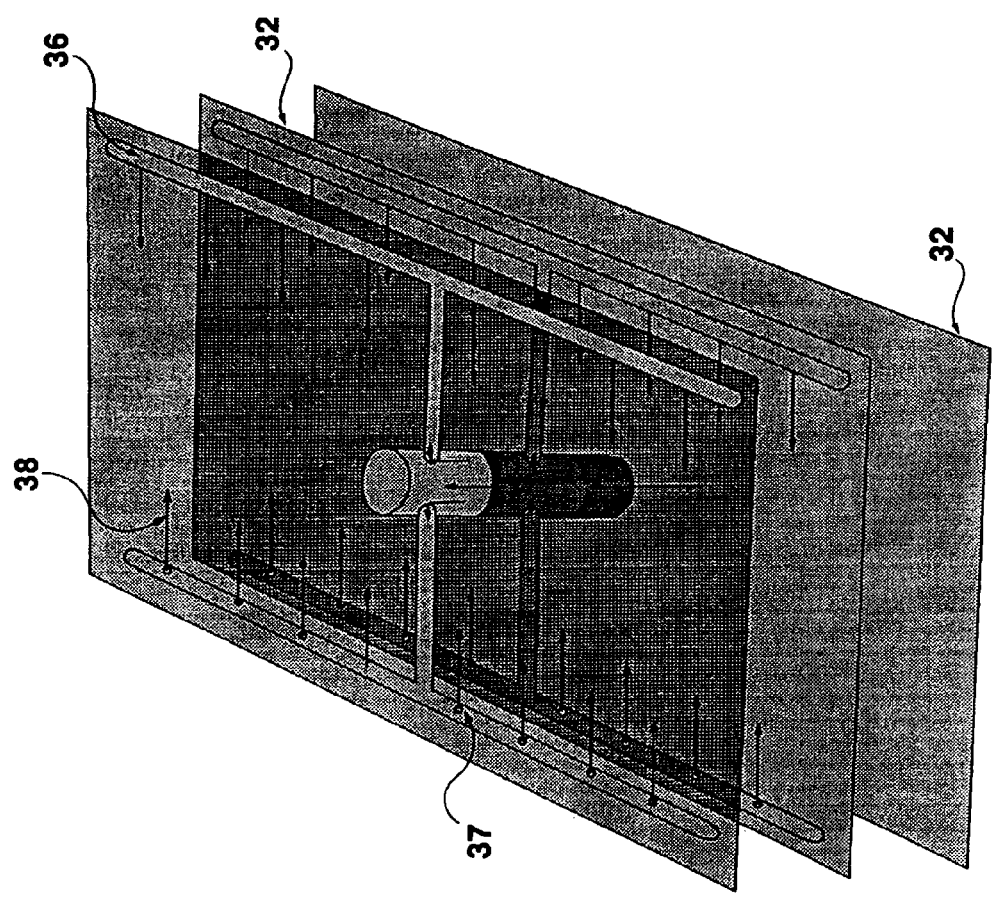
FIG. 5 is a view of the opposed flow design desalter internals of the current invention with the horizontal plenums parallel to the long axis of the desalter container. The arrows indicate direction of flow of the oil/water emulsion.

The water-in-hydrocarbon oil emulsion enters the vessel 30 through line 31 via three primary vertical riser pipes 33. As shown in FIGS. 3 and 4 three vertical riser pipes 33 are provided, however the number of primary vertical riser pipes is not limited to three and can be any number depending on the length of the container. Optionally, the primary vertical riser pipes could also be "downers" entering the top of the container. Each primary vertical riser pipe (33) is connected to a primary riser arm (34, FIG. 4) at the mid-point of the said primary riser arm 34 so that a "T" like structure is formed when the riser arm is horizontally disposed as shown in FIG. 4. However, other dispositions of arms 34 are within the scope of the invention such as a "Y" like structure, "U" like structure or equivalents. The "T" like structure if a preferred structure. The preferred "T" like structure is so oriented that the primary riser arm 34 is perpendicular to the long axis of the container. The primary riser arm 34 has a front end (F34, FIG. 4) and a back end (B34, FIG. 4). Connected to the front and back ends of the primary riser arm are a front secondary riser pipe (F35, FIG. 4) and a back secondary riser pipe (B35, FIG. 4) respectively. The front secondary riser pipe and back secondary riser pipe pass through openings in the electrostatic grids. The front secondary riser pipe and back secondary riser pipe are each connected to a series of horizontal plenums 36 (FIGS. 3 and 4), parallel to the horizontal axis of the container. On the front secondary riser pipe F35 and back secondary riser pipe B35 there is a horizontal plenum below each grid 32. A view of the internals with the horizontal plenums parallel to the long axis of the container and grids is shown in FIG. 5.

Figure 6:
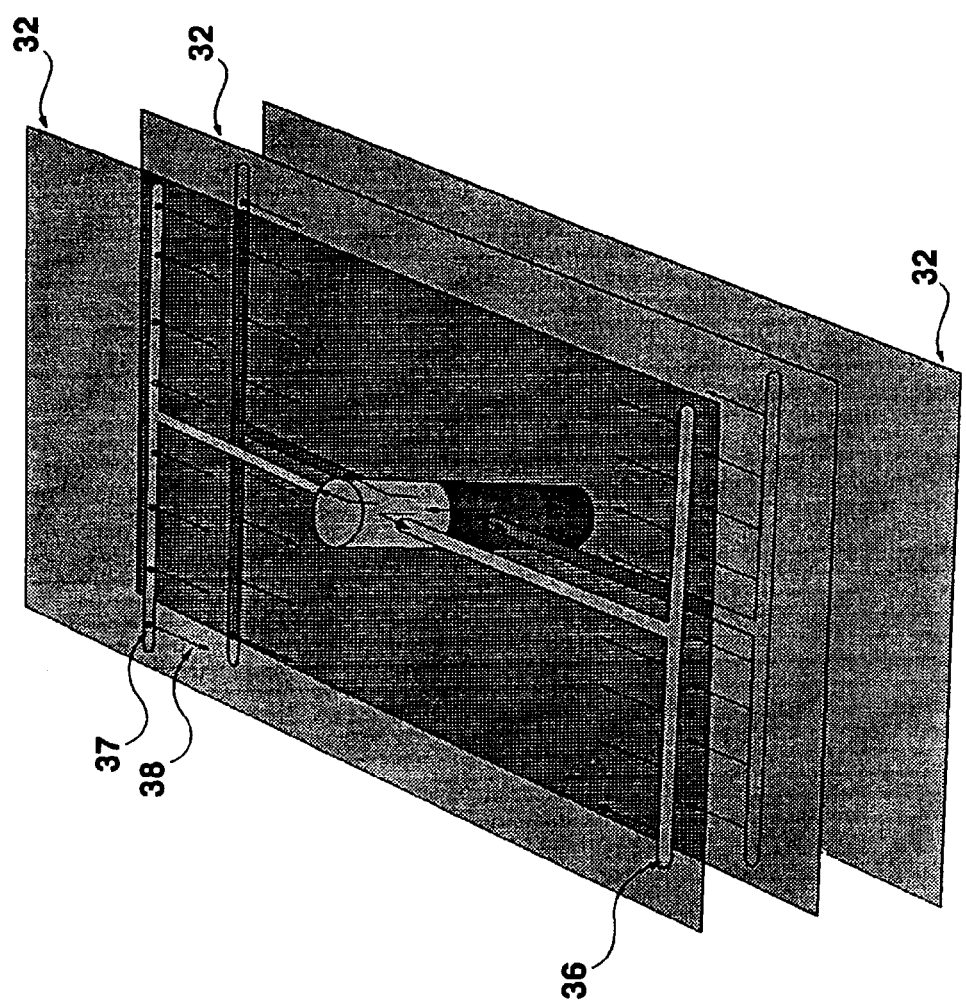
FIG. 6 is a view of the opposed flow design desalter internals of the current invention with the horizontal plenums perpendicular to the long axis of the desalter container. The arrows indicate direction of flow of the oil/water emulsion.

The horizontal plenums 36 can optionally be perpendicular to the long axis of the container and grids as shown in FIG. 6. The orientation of the horizontal plenums can be parallel between some pair of grids and perpendicular between another pair of grids. For example, in a three-grid arrangement the horizontal plenum between the lower and middle grid can be parallel and between the middle and upper grid can be perpendicular or vice versa. The pipes referred to in the current invention may be metallic, insulated metallic or non-conducting non-metallic to reduce effects of the piping on the electrical field between the electrical grids.

Along each horizontal plenum 36 is a plurality of nozzles 37 pointed horizontally across the container. This arrangement results in a set of opposed nozzles in each inter-grid region as well as below the lowest grid. The nozzles are preferably of the "flat fan" type producing a fan-shaped jet shown by dotted lines 38 in the horizontal plane parallel to the grids. Such nozzles are positioned on the plenums so as to produce a fan parallel to the grids. The flat fan nozzles are oriented to provide opposed flow. Round nozzles forming a solid conical jet can also be used. Each nozzle of a pair of opposed nozzles is preferably directly opposite the other with their axes coincident, resulting in maximum opposed flow. The face-to-face distance between the nozzles is adjusted to give optimum coalescence. The hydrodynamic design variables to obtain maximum coalescence include: nozzle type and size, nozzle spacing, jet velocity, nozzle face-to-face distance, and opposing nozzle spacing. One of ordinary skill in the art can select the combination of parameters required to obtain maximum coalescence.

In operation the oil-water emulsion flows via line 31 up the primary vertical riser pipe 33 to arm 34 splits into two streams at the junction of 33 and 34. Then it passes through the front secondary riser F35 and back secondary riser B35 and is distributed to the horizontal plenums 36 from which it flows through the nozzles, forming opposed jets 38 (FIG. 4) across the container's interior. Each jet can interact with its opposite number across the container to create the coalescing opposed jet flow field. Water droplets flowing in this field will be attracted to each other because of two forces: (a) electrostatic attraction and (b) hydrodynamic impaction. This results in enhanced coalescence relative to only electrostatic attraction. Baffles 39 (FIGS. 3 & 4) reduce turbulence of the oil above the topmost grid 32. Treated oil 44 that is desalted and/or dewatered is collected by the outlet manifold 40 (FIG. 4) having a plurality of apertures 41 therein and exits the desalter through the outlet pipe 42 (FIGS. 3 and 4). Water 46 that is separated from the emulsion is removed via line 47.

What is claimed is:

1. In an apparatus for dewatering and/or desalting a water-in-oil emulsion comprising a closed container, having a long axis and a short axis, wherein the long axis of said container is parallel to the ground, there being contained within said container a plurality of energized electrode grids, distributors for delivering said emulsion between said electrode grids, a plurality of primary vertical risers rising vertically from under said container to supply said emulsion to said distributors, a delivery pump connected to said plurality of primary vertical risers to pump said emulsion into said plurality of primary vertical risers, oil withdrawal means in the upper portion of container and water withdrawal means in the lower portion of said container, the improvement in the apparatus comprising:

each of said primary vertical riser connected to a primary riser arm at the middle thereof;

said primary riser arm having a front end and a back end and said primary riser arm being oriented perpendicular to the long axis of the container;

a secondary vertical front riser connected to the front end of the riser arm;

a secondary vertical back riser connected to the back end of the riser arm;

said secondary vertical front riser and secondary vertical back riser each including a plurality of horizontal plenums;

each of said horizontal plenums being located below an energized electrode grid;

each of the horizontal plenums including a plurality of nozzles;

each nozzle on each horizontal plenum of a front riser having an opposing nozzle on each horizontal plenum of a back riser;

wherein the nozzle on the front riser and the opposing nozzle on the back riser are positioned to face each other.

2. The improvement of claim 1 wherein said nozzles, under conditions of use, direct the emulsion flow so tat dispersed water droplets in said emulsion collide and coalesce.

3. The improvement of claim 1 wherein said nozzles are fan type, cone type or combinations thereof.

4. The improvement of claim 1 wherein the number of said horizontal plenums on each of said secondary vertical front riser and secondary vertical back riser equals the number of said energized electrode grids.

5. The improvement of claim 1 wherein each of said horizontal plenum is oriented perpendicular to said long axis of said container.

6. The improvement of claim 1 wherein each of said horizontal plenum is oriented parallel to said long axis of said container.

* * * * *